(12) United States Patent
Ko et al.

(10) Patent No.: US 8,867,332 B2
(45) Date of Patent: Oct. 21, 2014

(54) METHOD FOR TRANSMITTING DATA IN MULTIPLE ANTENNA SYSTEM

(75) Inventors: Hyun Soo Ko, Anyang-si (KR); Jae Hoon Chung, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 13/201,552

(22) PCT Filed: Feb. 16, 2010

(86) PCT No.: PCT/KR2010/000941
§ 371 (c)(1),
(2), (4) Date: Aug. 15, 2011

(87) PCT Pub. No.: WO2010/093217
PCT Pub. Date: Aug. 19, 2010

(65) Prior Publication Data
US 2011/0299383 A1  Dec. 8, 2011

Related U.S. Application Data

(60) Provisional application No. 61/152,733, filed on Feb. 16, 2009.

(30) Foreign Application Priority Data

Feb. 16, 2010  (KR) .......................... 10-2010-0013748

(51) Int. Cl.
*H04J 11/00* (2006.01)
*H04B 7/06* (2006.01)
*H04L 5/00* (2006.01)

(52) U.S. Cl.
CPC ............ *H04B 7/0613* (2013.01); *H04L 5/0046* (2013.01)
USPC .......................................... 370/210; 370/207

(58) Field of Classification Search
USPC .................. 370/210, 329, 335, 336; 714/748; 375/259, 295
See application file for complete search history.

(56) References Cited

U.S. PATENT DOCUMENTS

| | | | | |
|---|---|---|---|---|
| 2003/0003863 | A1* | 1/2003 | Thielecke et al. | 455/39 |
| 2010/0115358 | A1* | 5/2010 | Kotecha et al. | 714/748 |
| 2010/0195624 | A1* | 8/2010 | Zhang et al. | 370/335 |
| 2010/0202561 | A1* | 8/2010 | Gorokhov et al. | 375/295 |

FOREIGN PATENT DOCUMENTS

| | | |
|---|---|---|
| KR | 100785806 B1 | 12/2007 |
| KR | 1020080050221 A | 6/2008 |

* cited by examiner

*Primary Examiner* — Andrew Lai
*Assistant Examiner* — Jamaal Henson
(74) *Attorney, Agent, or Firm* — Mckenna Long & Aldridge LLP

(57) ABSTRACT

An apparatus for data transmission in a multi-antenna system is provided. The apparatus includes: a modulation mapper for modulating codewords into modulation symbols that express a position on a signal constellation; a layer permutator for mapping the modulation symbols to different layers; a transform precoder for generating a discrete Fourier transform (DFT) symbol of a frequency domain by performing DFT on the modulation symbol mapped to the layer; a resource element mapper for mapping the DFT symbol to a physical resource element; and a signal generator for generating a single carrier-frequency division multiple access (SC-FDMA) signal from the DFT symbol mapped to the resource element, wherein a modulation order of the modulation symbols is determined depending on the layer mapped by the layer permutator.

6 Claims, 17 Drawing Sheets

METHOD FOR TRANSMITTING DATA IN MULTIPLE ANTENNA SYSTEM

This application is a 35 U.S.C. §371 National Stage entry of International Application No. PCT/KR2010/000941, filed on Feb. 16, 2010, and claims priority to U.S. Provisional Application No. 61/152,733, filed Feb. 16, 2009 and Korean Application No. 10-2010-0013748, filed Feb. 16, 2010, each of which is hereby incorporated by reference in its entirety as if fully set forth herein.

TECHNICAL FIELD

The present invention relates to wireless communications, and more particularly, to an apparatus and method for data transmission in a multi-antenna system.

BACKGROUND ART

In next generation multimedia mobile communication systems, which have been actively studied in recent years, there is a demand for a system capable of processing and transmitting a variety of information (e.g., video and radio data) at a higher data rate in addition to the early-stage voice service. The wireless communication system is designed for the purpose of providing reliable communication to a plurality of users irrespective of their locations and mobility. However, a wireless channel experiences various problems such as path loss, shadowing, fading, noise, limited bandwidth, power limit of a user equipment (UE), and interference between other users. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission over a wireless channel. The use of the diversity can maximize data transfer capacity or data transfer reliability. A system for implementing the diversity by using multiple transmit (Tx) antennas and multiple receive (Rx) antennas is referred to as a multiple input multiple output (MIMO) system.

Exemplary schemes for diversity implementation in the MIMO system include space frequency block coding (SFBC), space time block coding (STBC), cyclic delay diversity (CDD), frequency switched transmit diversity (FSTD), time switched transmit diversity (TSTD), precoding vector switching (PVS), spatial multiplexing (SM), etc.

Meanwhile, an orthogonal frequency division multiplexing (OFDM) system capable of reducing inter-symbol interference with a low complexity is taken into consideration as one of post-$3^{rd}$ generation wireless communication systems. In the OFDM, a serially input data symbol is converted into N parallel data symbols, and is then transmitted by being carried on N orthogonal subcarriers. The subcarriers maintain orthogonality in a frequency dimension. An orthogonal frequency division multiple access (OFDMA) is a multiple access scheme for achieving multiple access by independently providing some of available subcarriers to each user in a system using the OFDM as a modulation scheme.

One of main problems of the OFDM/OFDMA system is that a peak-to-average power ratio (PAPR) can be significantly large. The PAPR problem occurs when a peak amplitude of a Tx signal is significantly larger than an average amplitude. Further, the PAPR problem is caused by a fact that an OFDM symbol is an overlap of N sinusoidal signals on different subcarriers. The PAPR is particularly problematic in a user equipment (UE) sensitive to power consumption in association with battery capacity. Therefore, the PAPR needs to be lowered to decrease power consumption.

Single carrier-frequency division multiple access (SC-FDMA) is proposed to decrease the PAPR. The SC-FDMA is frequency division multiple access (FDMA) combined with single carrier-frequency division equalization (SC-FDE). The SC-FDMA is similar to the OFDMA in that data is modulated and demodulated in a time domain and a frequency domain by using discrete Fourier transform (DFT). However, the SC-FDMA is advantageous to decrease Tx power since a Tx signal has a low PAPR. In particular, regarding battery usage, the SC-FDMA is advantageous in case of uplink transmission where communication is achieved from a UE sensitive to Tx power to a base station (BS). When the UE transmits data to the BS, the transmitted data does not require a large bandwidth but a wide coverage is important for power concentration. The SC-FDMA system allows a small signal variation, and thus has a much wider coverage than other systems when using the same power amplifier.

In order to apply the MIMO transmission scheme used in multi-codeword transmission to the SC-FDMA system, it is important to maintain a single-carrier property to guarantee a low PAPR or a low cubic metric (CM).

SUMMARY OF INVENTION

Technical Problem

The present invention provides a multi-codeword transmission method which maintains a low peak to average power ratio (PAPR) or cubic metric (CM) in a single carrier-frequency division multiple access (SC-FDMA) system based on multiple antennas.

Technical Solution

According to an aspect of the present invention, an apparatus for data transmission in a multi-antenna system is provided.

The apparatus includes: a modulation mapper for modulating codewords into modulation symbols that express a position on a signal constellation; a layer permutator for mapping the modulation symbols to different layers; a transform precoder for generating a discrete Fourier transform (DFT) symbol of a frequency domain by performing DFT on the modulation symbol mapped to the layer; a resource element mapper for mapping the DFT symbol to a physical resource element; and a signal generator for generating a single carrier-frequency division multiple access (SC-FDMA) signal from the DFT symbol mapped to the resource element, wherein a modulation order of the modulation symbols is determined depending on the layer mapped by the layer permutator.

According to another aspect of the present invention, a method of performing DFT for transmission of an SC-FDMA signal is provided. The method includes: modulating codewords into modulation symbols that express a position on a signal constellation; mapping the modulation symbols to different layers; performing DFT on modulation symbols mapped to the different layers, wherein a modulation order of the modulation symbols is determined depending on the layer to which the modulation symbols are mapped.

Advantageous Effects

According to the present invention, multi-codeword transmission can be performed with a low peak to average power ratio (PAPR) or cubic metric (CM) in a single carrier-frequency division multiple access (SC-FDMA) system while maintaining a single-carrier property.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE)802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity of explanation, the following description will focus on the 3GPP LTE/LTE-A. However, the technical features of the present invention are not limited thereto.

Figure 1:
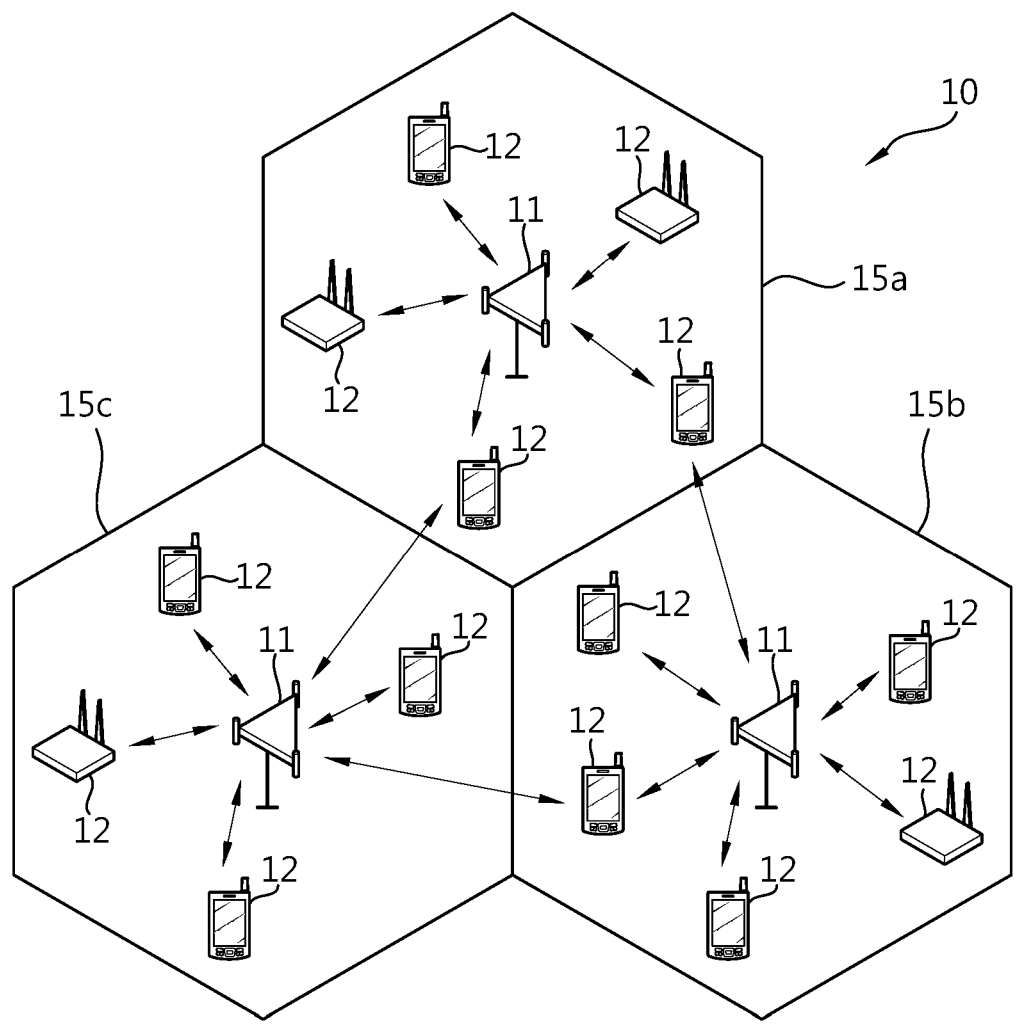
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

A multiple antenna system may be any one of a multiple input multiple output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna denotes a physical or logical antenna used for transmission of one signal or stream. The Rx antenna denotes a physical or logical antenna used for reception of one signal or stream.

Figure 2:
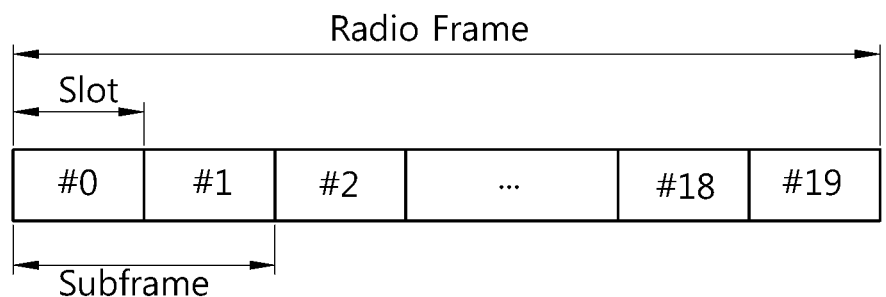
FIG. 2 shows a structure of a radio frame in $3^{rd}$ generation partnership project (3GPP) long term evolution (LTE).

FIG. 2 shows a structure of a radio frame in 3GPP LTE.

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 2 is shown for exemplary purposes only. Thus, the number of subframes included in the radio frame or the number of slots included in the subframe may change variously.

Figure 3:
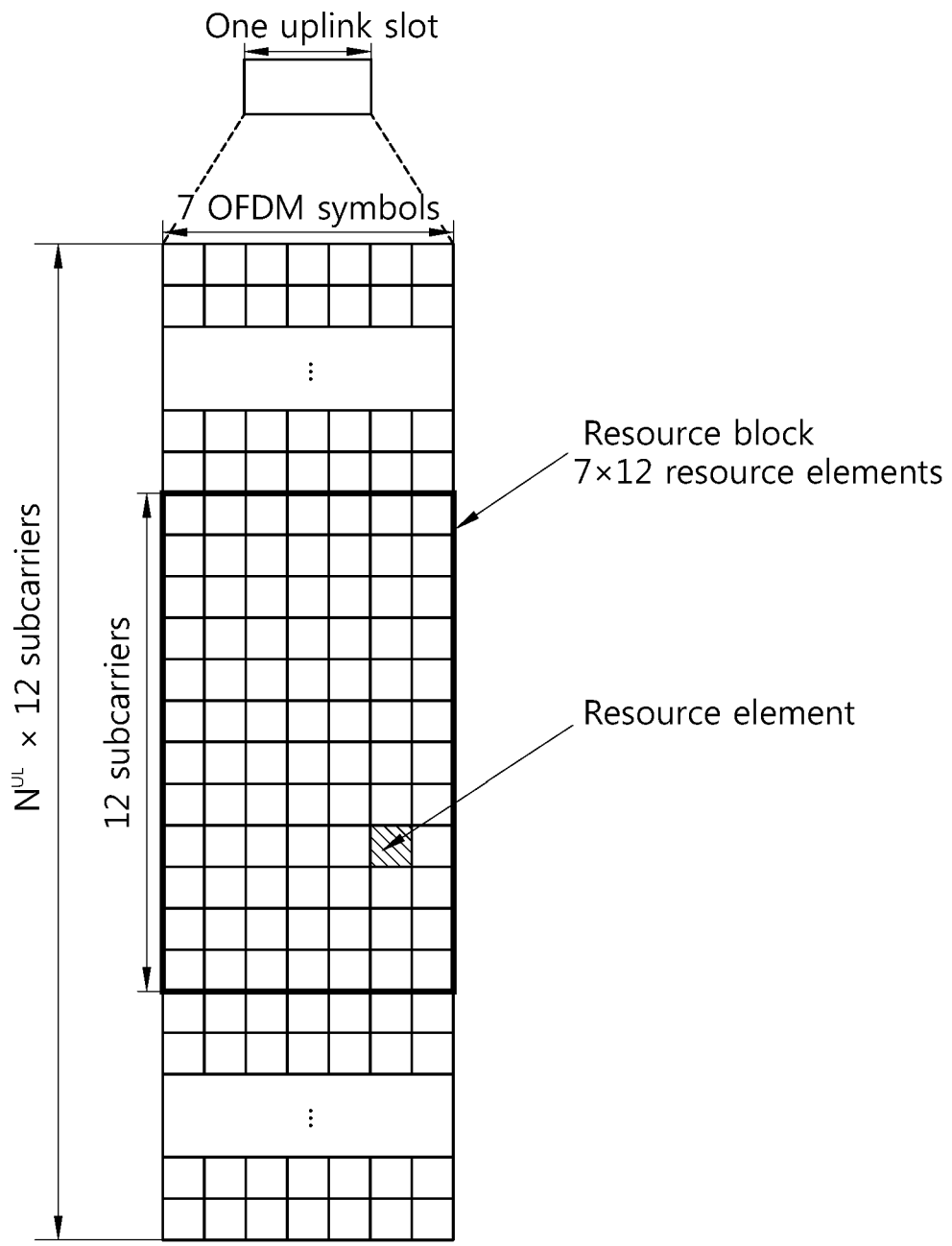
FIG. 3 shows an example of a resource grid for one uplink slot in 3GPP LTE.

FIG. 3 shows an example of a resource grid for one UL slot in 3GPP LTE.

Referring to FIG. 3, the UL slot includes a plurality of orthogonal frequency division multiplexing (OFDM) symbols in a time domain, and includes $N^{UL}$ resource blocks (RBs) in a frequency domain. The OFDM symbol represents one symbol period. The OFDM symbol can also be referred to as an SC-FDMA symbol, an OFDMA symbol, or a symbol period according to a system. The RB is a unit of resource allocation and includes a plurality of subcarriers in the frequency domain. The number $N^{UL}$ of RBs included in the UL slot depends on a UL transmission bandwidth defined in a cell. Each element on the resource grid is referred to as a resource element.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of subcarriers or the number of OFDM symbols included in the RB may change variously. The number of OFDM symbols may change depending on a cyclic prefix (CP) length. For example, when using a normal CP, the number of OFDM symbols is 7, and when using an extended CP, the number of OFDM symbols is 6.

The resource grid for one UL slot in the 3GPP LTE of FIG. 3 can directly apply to a resource grid for a DL slot.

Figure 4:
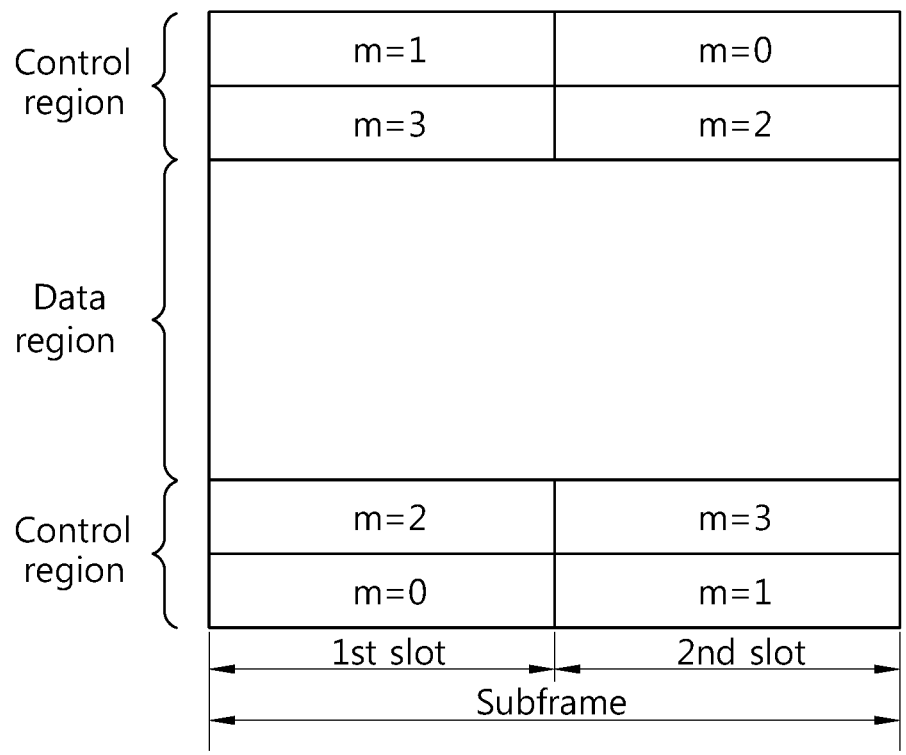
FIG. 4 shows an example of an uplink subframe structure in 3GPP LTE.

FIG. 4 shows an example of a UL subframe structure in 3GPP LTE.

Referring to FIG. 4, a UL subframe can be divided into a control region to which a physical uplink control channel (PUCCH) for carrying UL control information is allocated and a data region to which a physical uplink shared channel (PUSCH) for carrying UL data is allocated. RBs allocated to one UE are contiguous in a frequency domain in order to maintain a single-carrier property. One UE cannot concurrently transmit the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. Since the UE transmits UL control information over time through different subcarriers, a frequency diversity gain can be obtained. In FIG. 4, m is a location index indicating a logical frequency-domain location of the RB pair allocated to the PUCCH in the subframe.

Examples of UL control information transmitted on the PUCCH include a hybrid automatic repeat request (HARQ) acknowledgement (ACK)/negative acknowledgement (NACK) signal, a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the control information multiplexed to the data include a CQI, a precoding matrix indicator (PMI), an HARQ ACK/NACK signal, a rank indicator (RI), etc. On the other hand, the UL data may consist of only control information.

Hereinafter, a data transmission method will be described. Although the following description is based on UL data transmitted from a UE to a BS, it is also applicable to DL data transmitted from the BS to the UE.

Figure 5:
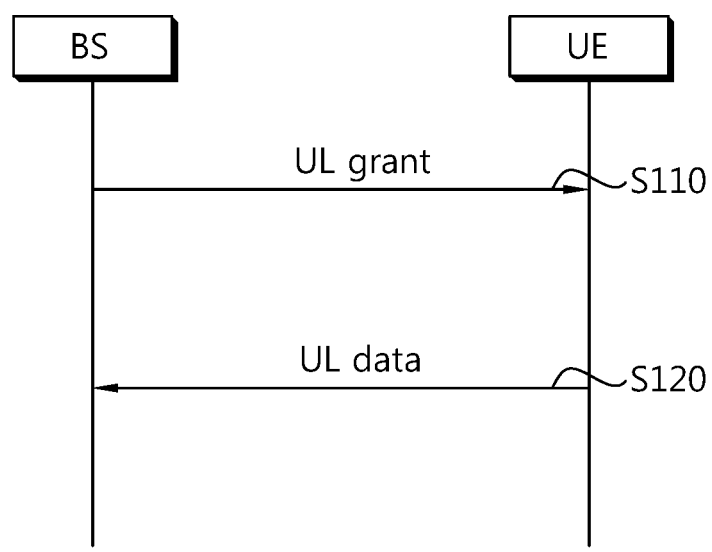
FIG. 5 is a flowchart showing an example of a data transmission method.

FIG. 5 is a flowchart showing an example of a data transmission method.

Referring to FIG. 5, a BS transmits a UL grant to a UE (step S110). The UE transmits UL data to the BS by using the UL grant (step S120). The UL grant may be transmitted on a physical downlink control channel (PDCCH), and the UL data may be transmitted on a PUSCH. A relationship between a subframe in which the PDCCH is transmitted and a subframe in which the PUSCH is transmitted may be predetermined between the BS and the UE. For example, in a frequency division duplex (FDD) system, if the PDCCH is transmitted through an $n^{th}$ subframe, the PUSCH may be transmitted through an $(n+4)^{th}$ subframe.

The UL grant is DL control information for UL data scheduling. The UL grant includes a resource allocation field. The UL grant may further include a hopping flag for indicating whether frequency hopping is performed, a flag for identifying the UL grant from other DL control information, a transmission format field for indicating a transmission format for UL data, a new data indicator (NDI) for indicating whether the UL grant is for transmission of new UL data or retransmission of the UL data, a transmit power control (TPC) command field for UL power control, a CS field for indicating a cyclic shift (CS) of a demodulation reference signal (DM RS), a CQI request indicator for indicating whether to request a CQI, etc.

The resource allocation field indicates a radio resource for UL data transmission. The radio resource may be a time-frequency resource. In 3GPP LTE, the radio resource allocated by the resource allocation field is a resource block. By using the resource allocation field, a UE can know a location of a resource block in a subframe allocated for UL data transmission, the number of resource blocks, etc.

If the hopping flag does not indicate the frequency hopping, resource blocks allocated to the UE in $1^{st}$ and $2^{nd}$ slots in a subframe are identical in a frequency domain. If the hopping flag indicates the frequency hopping, the resource blocks allocated to the UE in the $1^{st}$ and $2^{nd}$ slots may be different in the frequency domain.

Examples of radio resource scheduling include dynamic scheduling, persistent scheduling, semi-persistent scheduling (SPS), etc. If the radio resource scheduling is the persistent scheduling or the semi-persistent scheduling, the UE is able to transmit UL data without having to receive a UL grant.

It is assumed hereinafter that a radio resource for data transmission includes a plurality of OFDM symbols in a time domain, and includes a plurality of subcarriers in a frequency domain.

Figure 6:
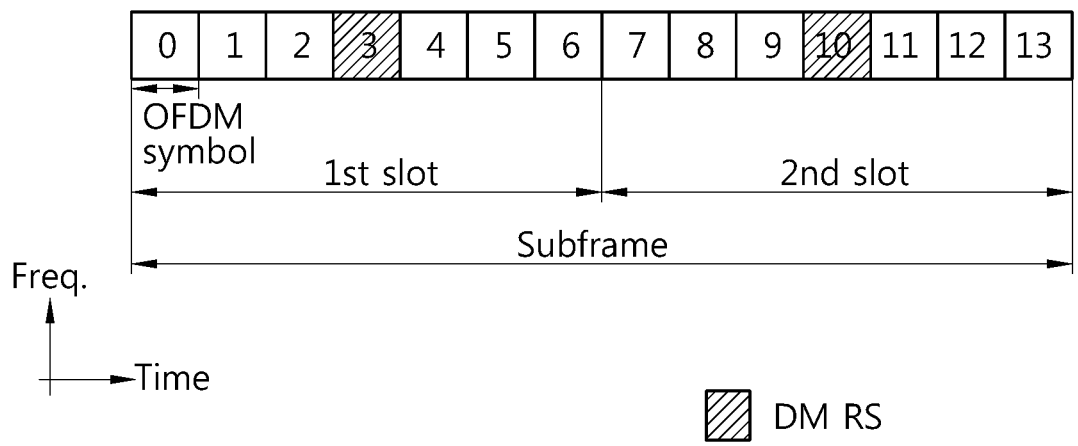
FIG. 6 shows an example of a radio resource for data transmission in case of a normal cyclic prefix (CP).

FIG. 6 shows an example of a radio resource for data transmission in case of a normal CP.

Referring to FIG. 6, a subframe includes a $1^{st}$ slot and a $2^{nd}$ slot. Each of the $1^{st}$ slot and the $2^{nd}$ slot includes 7 OFDM symbols. 14 OFDM symbols in the subframe are numbered with symbol indices 0 to 13. A DM RS is transmitted by using OFDM symbols having symbol indices 3 and 10. Data is transmitted by using the remaining OFDM symbols other than the OFDM symbols in which the DM RS is transmitted. The DM RS is used for channel estimation for data demodulation and is a signal known to both a transmitter and a receiver.

Figure 7:
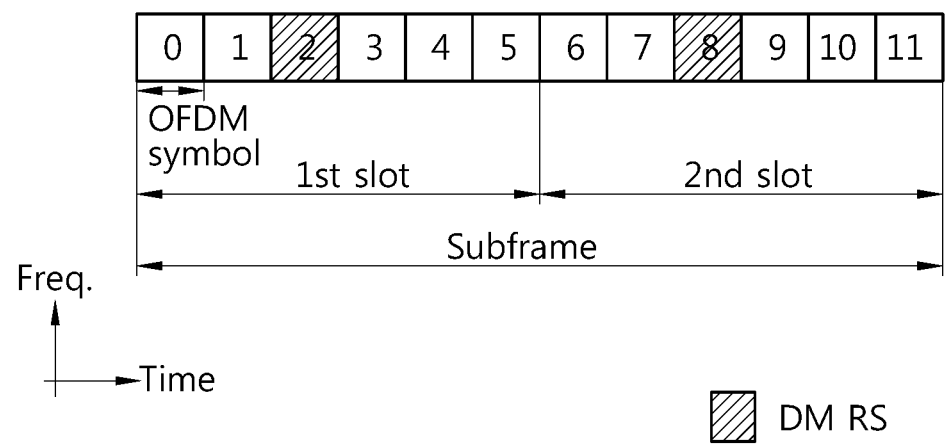
FIG. 7 shows an example of a radio resource for data transmission in case of an extended CP.

FIG. 7 shows an example of a radio resource for data transmission in case of an extended CP.

Referring to FIG. 7, a subframe includes a $1^{st}$ slot and a $2^{nd}$ slot. Each of the $1^{st}$ slot and the $2^{nd}$ slot includes 6 OFDM symbols. 12 OFDM symbols in the subframe are numbered with symbol indices 0 to 11. A DM RS is transmitted by using OFDM symbols having symbol indices 2 and 8. Data is transmitted by using the remaining OFDM symbols other than the OFDM symbols in which the DM RS is transmitted.

Although not shown in FIG. 6 and FIG. 7, a sounding reference signal (SRS) may also be transmitted through an OFDM symbol in the subframe. The SRS is a reference signal transmitted for UL scheduling from a UE to a BS. The BS estimates a UL channel through the received SRS, and uses the estimated UL channel in UL scheduling. The reference signal implies the DM RS and/or the SRS.

Hereinafter, an OFDM symbol for data transmission is referred to as a data symbol, an OFDM symbol for DM RS transmission is referred to as a DM RS symbol, and an OFDM symbol for SRS transmission is referred to as an SRS symbol. A reference signal symbol implies the DM RS symbol and/or the SRS symbol. In FIG. 6, there are 12 data symbols and 2 DM RS symbols in one subframe. In FIG. 7, there are 10 data symbols and 2 DM RS symbols in one subframe.

Figure 8:
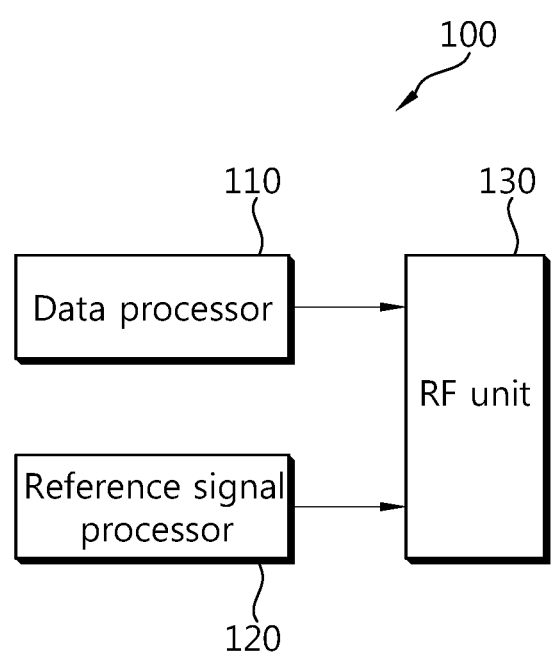
FIG. 8 is a block diagram showing an exemplary structure of a transmitter.

FIG. 8 is a block diagram showing an exemplary structure of a transmitter. Herein, the transmitter may be a part of a UE or a BS.

Referring to FIG. 8, a transmitter 100 includes a data processor 110, a reference signal processor 120, and a radio frequency (RF) unit 130. The RF unit 130 is coupled to the data processor 110 and the reference signal processor 120. The data processor 110 processes data to generate a baseband signal for the data. The reference signal processor 120 generates and processes a reference signal, and generates a baseband signal for the reference signal. The RF unit 130 converts the baseband signal (i.e., the baseband signal for the data and/or the baseband signal for the reference signal) into a radio signal, and transmits the radio signal. In this case, the baseband signal can be converted to the radio signal by being up-converted to a carrier frequency which is a center frequency of a cell.

Figure 9:
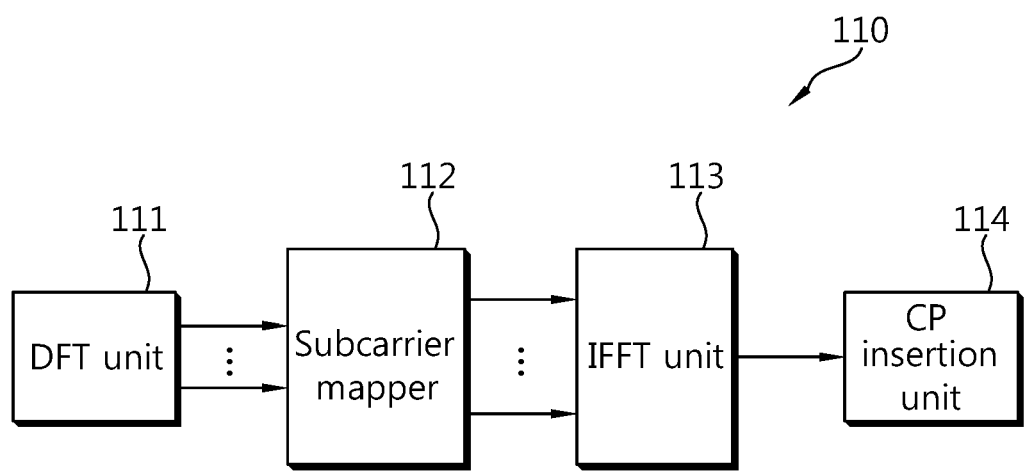
FIG. 9 is a block diagram showing an exemplary structure of a data processor.

FIG. 9 is a block diagram showing an exemplary structure of a data processor. Herein, the data processor may be included in a transmitter.

Referring to FIG. 9, a data processor 110 includes a discrete Fourier transform (DFT) unit 111, a subcarrier mapper 112, an inverse fast Fourier transform (IFFT) unit 113, and a CP insertion unit 114. The data processor 110 may further include a scrambling unit (not shown), a modulation mapper (not shown), a layer mapper (not shown), and a layer permutator (not shown) in front of the DFT unit 111. The elements not shown in the figure will be described below.

The DFT unit 111 performs DFT on the input symbols to output complex-valued symbols. For example, if $N_{tx}$ symbols are input, a DFT size is $N_{tx}$ (where $N_{tx}$ is a natural number). Hereinafter, the DFT unit 111 is also referred to as a transform precoder.

The subcarrier mapper 112 maps the complex-valued symbols to respective subcarriers in a frequency domain. The complex-valued symbols can be mapped to resource elements corresponding to a resource block allocated for data transmission. Hereinafter, the subcarrier mapper 112 can also be referred to as a resource element mapper. The IFFT unit 113 performs IFFT on the input symbols to output a baseband signal for data as a time-domain signal. If an IFFT size is $N_{FFT}$, $N_{FFT}$ can be determined by a channel bandwidth (where $N_{FFT}$ is a natural number). The CP insertion unit 114 copies a rear part of the baseband signal for the data and inserts the copy in front of the baseband signal for the data. Inter symbol interference (ISI) and inter carrier interference (ICI) are avoided by CP insertion, and thus orthogonality can be maintained even in a multi-path channel.

As such, a transmission mechanism in which IFFT is performed after DFT spreading is referred to as SC-FDMA. The SC-FDMA can also be referred to as DFT spread-OFDM (DFTs-OFDM). In the SC-FDMA, a peak-to-average power ratio (PAPR) or a cubic metric (CM) can be decreased. When using the SC-FDMA transmission mechanism, transmit power efficiency can be increased in a UE of which power consumption is limited. Accordingly, a user throughput can be increased.

Figure 10:
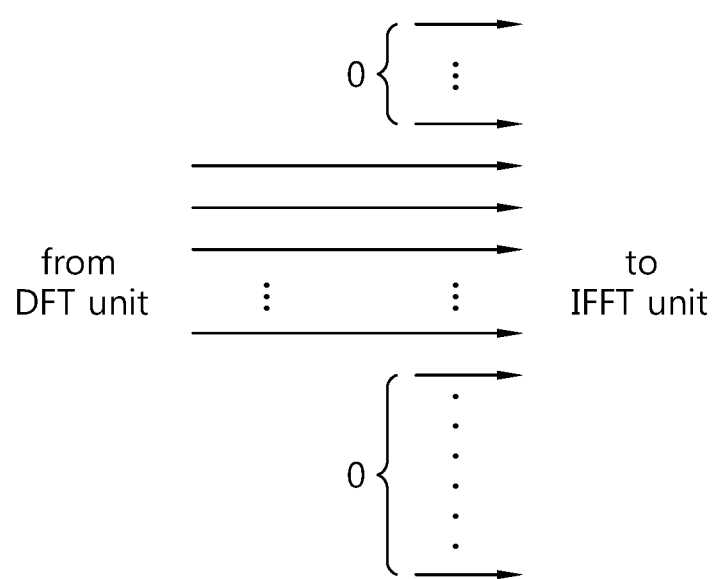
FIG. 10 shows an exemplary method of mapping complex-valued symbols onto respective subcarriers in a frequency domain by a subcarrier mapper.

FIG. 10 shows an exemplary method of mapping complex-valued symbols onto respective subcarriers in a frequency domain by a subcarrier mapper.

Referring to FIG. 10, the subcarrier mapper maps complex-valued symbols output from a DFT unit onto consecutive subcarriers in the frequency domain. '0' is inserted to subcarriers onto which the plurality of complex-valued symbols are not mapped. This is referred to as localized mapping. The localized mapping is used in 3GPP LTE.

Figure 11:
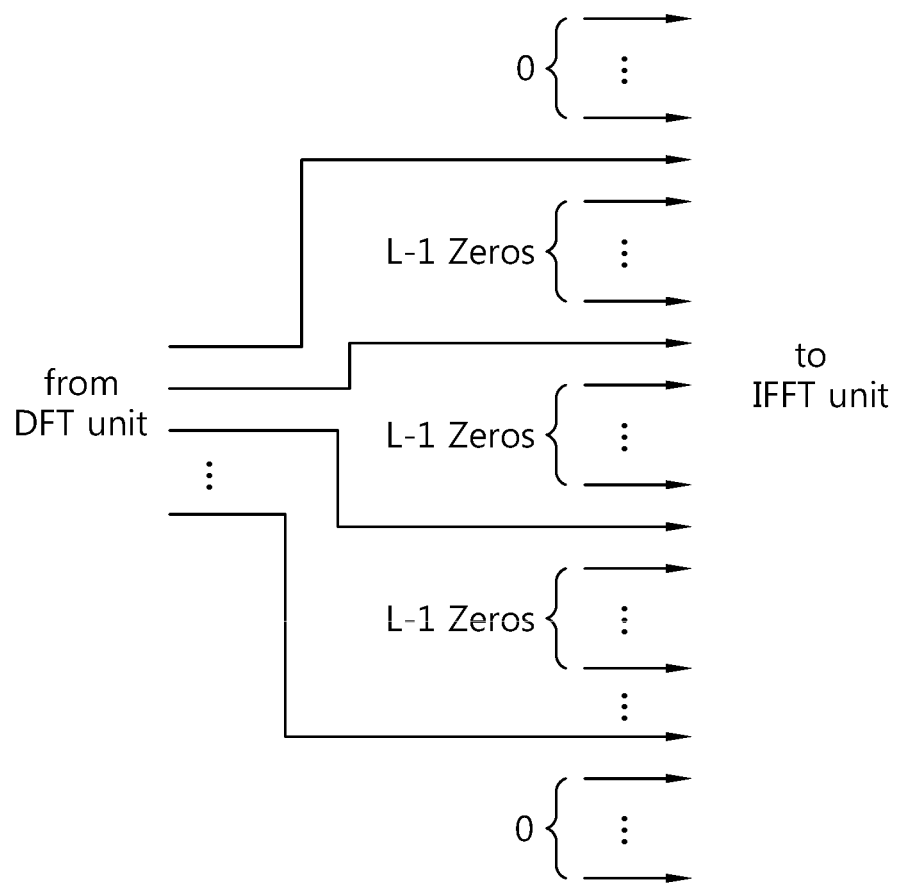
FIG. 11 shows another exemplary method of mapping complex-valued symbols onto respective subcarriers in a frequency domain by a subcarrier mapper.

FIG. 11 shows another exemplary method of mapping complex-valued symbols onto respective subcarriers in a frequency domain by a subcarrier mapper.

Referring to FIG. 11, the subcarrier mapper inserts L−1 '0's (where L is a natural number) into every two consecutive complex-valued symbols output from a DFT unit. That is, the complex-valued symbols output from the DFT unit are mapped onto subcarriers equidistantly distributed in the frequency domain. This is referred to as distributed mapping.

When the subcarrier mapper uses the localized mapping of FIG. 10 or the distributed mapping of FIG. 11, a single-carrier property is maintained.

Figure 12:
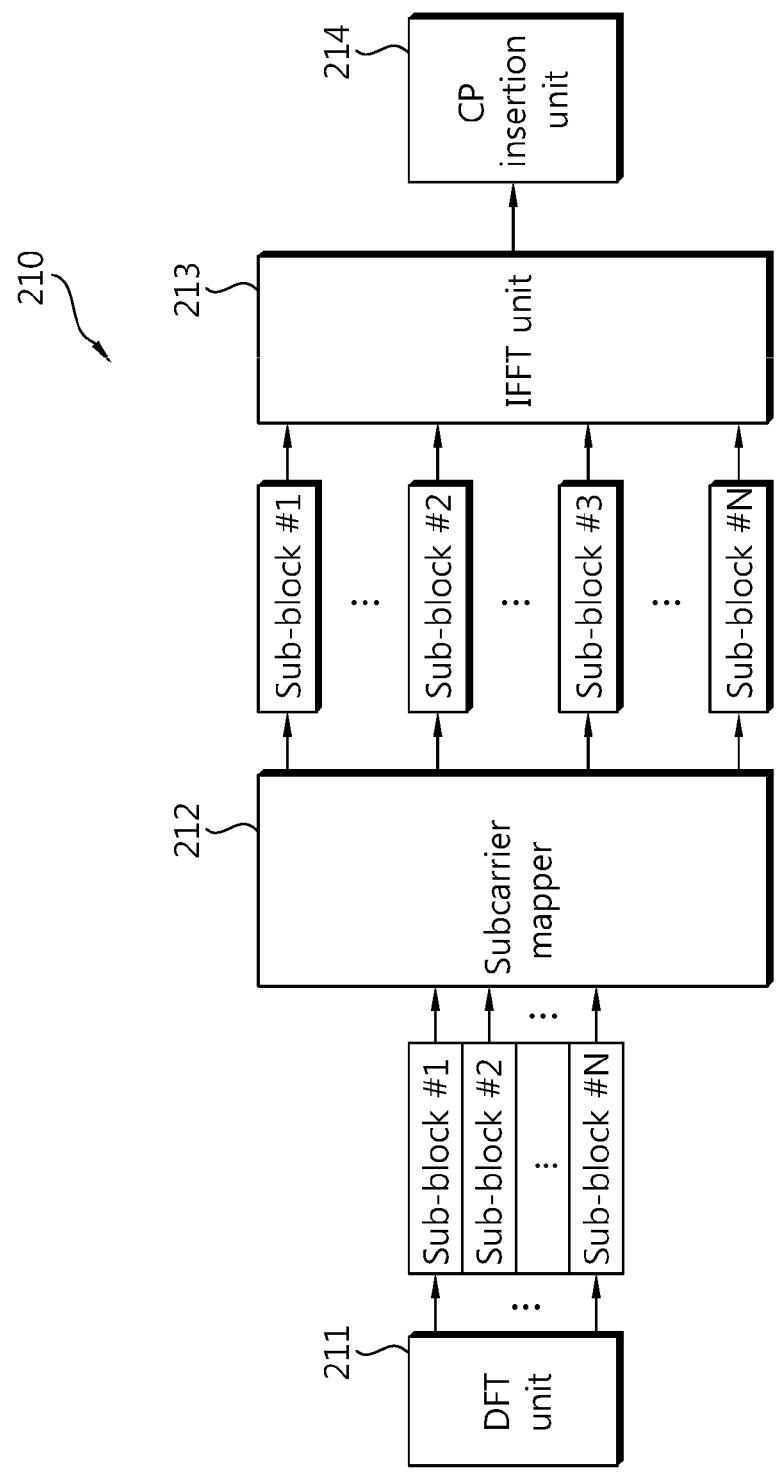
FIG. 12 is a block diagram showing another exemplary structure of a data processor.

FIG. 12 is a block diagram showing another exemplary structure of a data processor. Herein, the data processor may be included in a transmitter.

Referring to FIG. 12, a data processor 210 includes a DFT unit 211, a subcarrier mapper 212, an IFFT unit 213, and a CP insertion unit 214. The data processor 210 may further include a scrambling unit (not shown), a modulation mapper (not shown), a layer mapper (not shown), and a layer permutator (not shown) in front of the DFT unit 211. The elements not shown in the figure will be described below.

Complex-valued symbols output from the DFT unit 211 are segmented into N sub-blocks (where N is a natural number). Herein, the N sub-blocks can be represented with a sub-block #1, a sub-block #2, . . . , a sub-block #N. The subcarrier mapper 212 maps the N sub-blocks onto subcarriers by distributing the sub-blocks in a frequency domain. NULL can be inserted into every two consecutive sub-blocks. Complex-valued symbols in one sub-block can be mapped to consecutive subcarriers in the frequency domain. That is, localized mapping can be used in one sub-block.

The data processor of FIG. 12 can be used in both a single-carrier transmitter and a multi-carrier transmitter. The single-carrier transmitter is a transmitter using one carrier, and the multi-carrier transmitter is a transmitter using multiple carriers. When used in the single-carrier transmitter, all of the N sub-blocks correspond to one carrier. On the other hand, when used in multi-carrier transmitter, each of the N sub-blocks may correspond to one carrier. Alternatively, when used in the multi-carrier transmitter, a plurality of sub-blocks among the N sub-blocks may correspond to one carrier.

However, a time-domain signal is generated in the data processor of FIG. 12 by using one IFFT unit. Therefore, in order for the data processor to be used in the multi-carrier transmitter, a subcarrier spacing between contiguous carriers has to be aligned in a contiguous carrier allocation situation.

Figure 13:
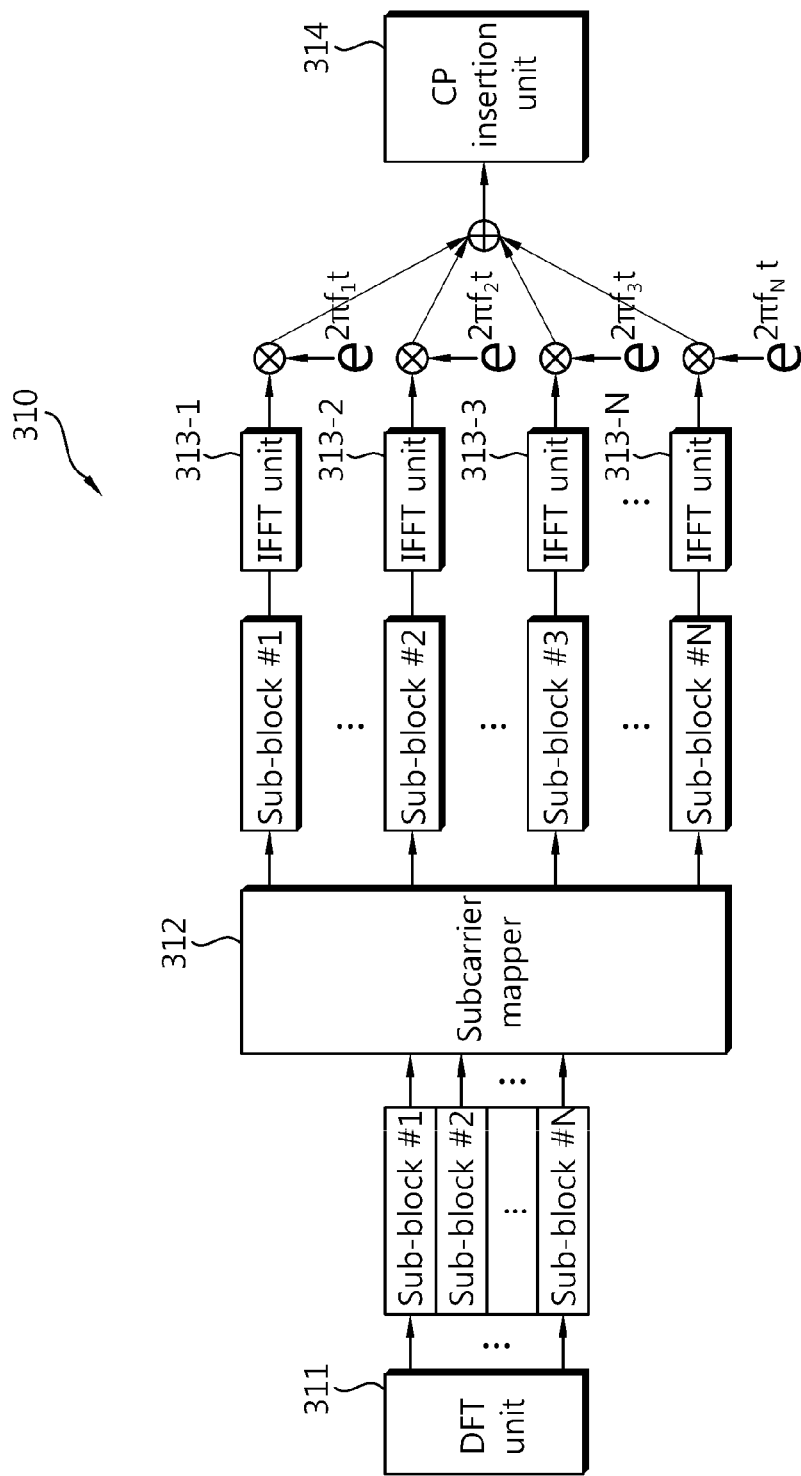
FIG. 13 is a block diagram showing another exemplary structure of a data processor.

FIG. 13 is a block diagram showing another exemplary structure of a data processor. Herein, the data processor may be included in a multi-carrier transmitter.

Referring to FIG. 13, a data processor 310 includes a DFT unit 311, a subcarrier mapper 312, a plurality of IFFT units 313-1, 313-2, . . . , 313-N, and a CP insertion unit 314 (where N is a natural number) The data processor 310 may further include a scrambling unit (not shown), a modulation mapper (not shown), a layer mapper (not shown), and a layer permutator (not shown) in front of the DFT unit 311. The elements not shown in the figure will be described below. IFFT is individually performed on each of N sub-blocks. An $n^{th}$ IFFT unit 313-$n$ performs IFFT on a sub-block #n to output an $n^{th}$ baseband signal (where n=1, 2 . . . , N). The $n^{th}$ baseband signal is multiplied by a signal of an $n^{th}$ carrier signal $f_n$ to generate an $n^{th}$ radio signal. N radio signals generated from the N sub-blocks are added, and thereafter a CP is inserted by the CP insertion unit 314.

The data processor of FIG. 13 can be used in a non-contiguous carrier allocation situation in which carriers allocated to the transmitter are not contiguous to each other.

As shown in FIG. 12 and FIG. 13, when symbols output from the DFT unit are processed by being divided into a plurality of sub-blocks, it is called clustered SC-FDMA.

Figure 14:
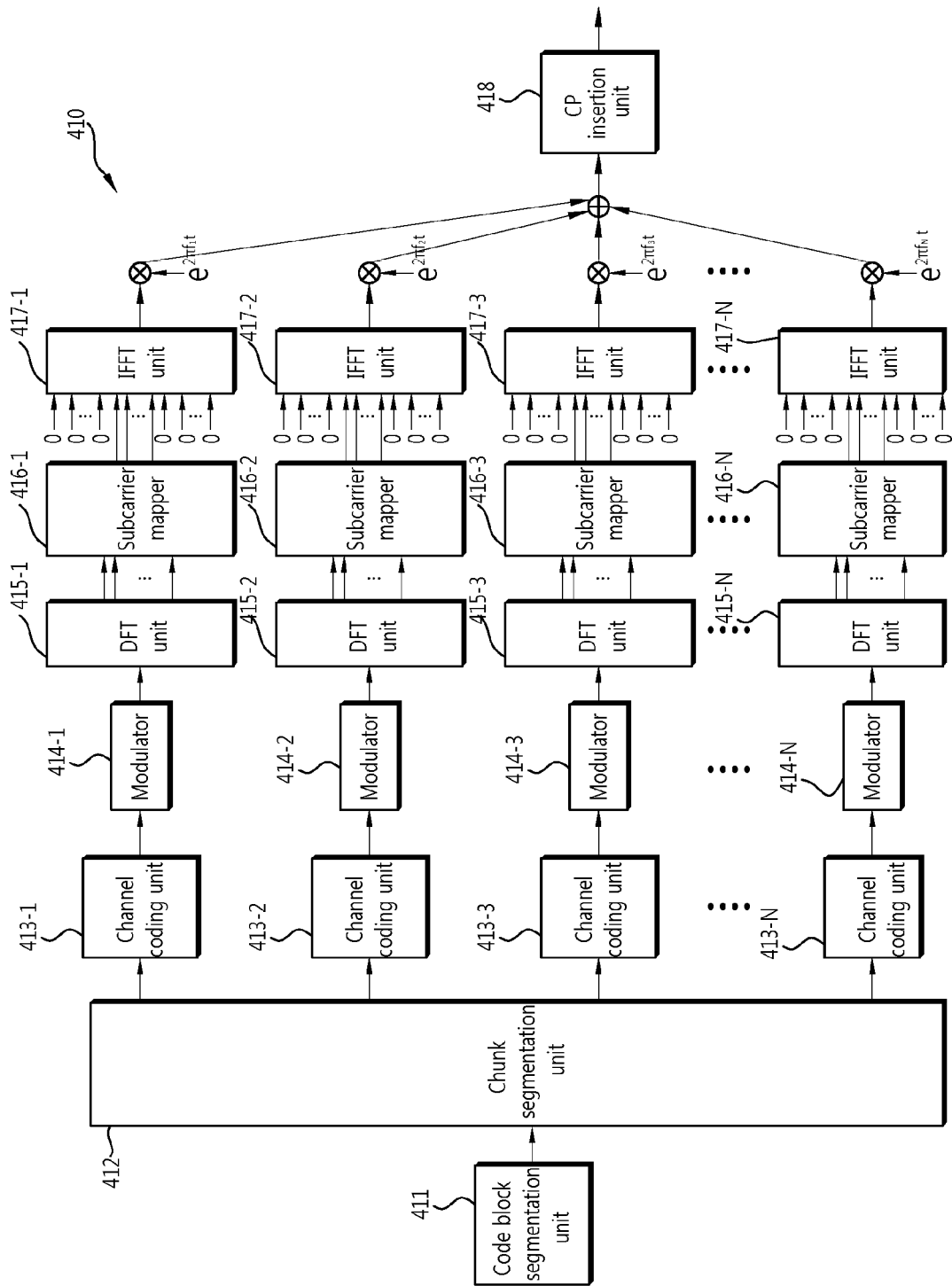
FIG. 14 is a block diagram showing another exemplary structure of a data processor.

FIG. 14 is a block diagram showing another exemplary structure of a data processor. Herein, the data processor may be included in a multi-carrier transmitter.

Referring to FIG. 14, a data processor 410 includes a code block segmentation unit 411, a chunk segmentation unit 412, a plurality of channel coding units 413-1, . . . , 413-N, a plurality of modulators 414-1, . . . , 414-N, a plurality of DFT units 415-1, . . . , 415-N, a plurality of subcarrier mappers 416-1, . . . , 416-N, a plurality of IFFT units 417-1, . . . , 417-N, and a CP insertion unit 418 (where N is a natural number). Herein, N can be the number of multiple carriers used in the multi-carrier transmitter. Each of the channel coding units 413-1, . . . , 413-N may include a scrambling unit (not shown). The modulators 414-1, . . . , 414-N can also be referred to modulation mappers. A layer mapper (not shown) and a layer permutator (not shown) may be included in front of the DFT units 415-1, . . . , 415-N. The elements not shown in the figure will be described below.

The code block segmentation unit 411 segments a transport block into a plurality of code blocks. The chunk segmentation unit 412 segments the code block into a plurality of chunks. Herein, the code block can be data transmitted from a multi-carrier transmitter, and the chunk can be a data fragment transmitted by using one carrier among multiple carriers. The data processor 410 performs DFT on a chunk basis. The data processor 410 can be used in both a non-contiguous carrier allocation situation and a contiguous carrier allocation situation. A transmission mechanism in which DFT is performed on a chunk basis as shown in FIG. 14 is referred to as chunk specific DFTs-OFDM or N×SC-FDMA.

Figure 15:
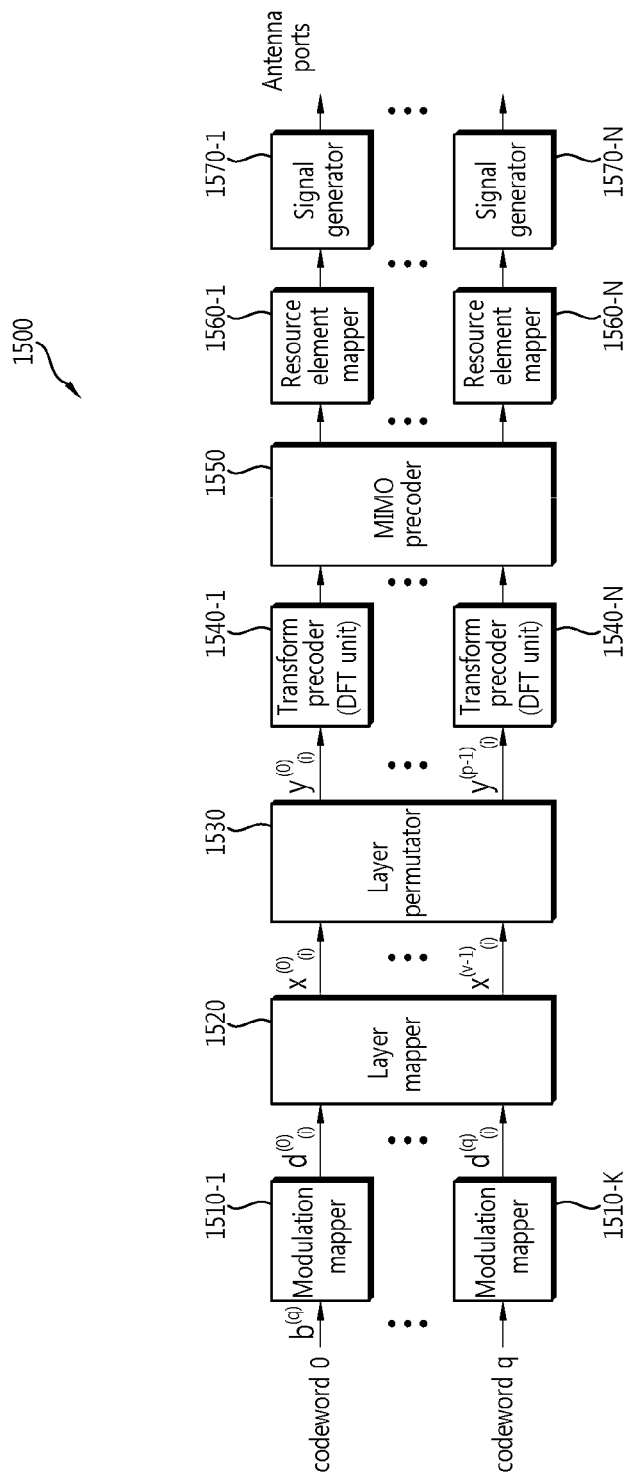
FIG. 15 is a block diagram showing a structure of a transmitter according to an embodiment of the present invention.

FIG. 15 is a block diagram showing a structure of a transmitter according to an embodiment of the present invention. The transmitter may be used for UL transmission that uses an SC-FDMA scheme.

Referring to FIG. 15, a transmitter 1500 may include modulation mappers 1510-1, . . . , 1510-K, a layer mapper 1520, a layer permutator 1530, transform precoders (DFT units) 1540-1, . . . , 1540-N, a MIMO precoder 1550, resource element mappers 1560-1, . . . , 1560-N, and signal generators 1570-1, . . . , 1570-N.

The modulation mappers 1510-1, . . . , 1510-K receive a codeword and maps the codeword to a modulation symbol that expresses a location on a signal constellation. The codeword implies coded data obtained by performing encoding according to a predetermined coding scheme. Although not shown, the codeword may be input to the modulation mappers 1510-1, . . . , 1510-K after being subjected to scrambling. A codeword q can be expressed by Equation 1 below.

$$b^{(q)}(k)=[b^{(q)}(0)b^{(q)}(1)\ldots b^{(q)}(N_{bit}^{(q)}-1)] \quad \text{[Equation 1]}$$

In Equation 1, q denotes a codeword index, and $N^{(q)}_{bit}$ denotes the number of bits of the codeword q. k has a value in the range of 0 to $N^{(q)}_{bit}-1$.

A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM. That is, a modulation symbol modulated by the modulation mapper has a complex value. The codeword q mapped to the symbol on the signal constellation can be expressed by a modulation symbol sequence as expressed by Equation 2 below.

$$d^{(q)}(i)=d^{(q)}(0),\ldots d^{(q)}(M_{symb}^{(q)}-1) \quad \text{[Equation 2]}$$

In Equation 2, q denotes a codeword index, and $M^{(q)}_{symb}$ denotes the number of symbols of the codeword q.

A mapping relation between $b^{(q)}(k)$ and $d^{(q)}(i)$ is performed by the modulation mappers 1510-1, . . . ; 1510-K according to the embodiment of the present invention, and will be described below in comparison with the conventional method.

The layer mapper 1520 receives a modulation symbol sequence (i.e., $d^{(q)}(i)$) from the modulation mappers 1510-1, . . . , 1510-K and performs codeword-to-layer mapping. A modulation symbol x(i) on which the codeword-to-layer mapping is performed can be expressed by Equation 3 below.

$$x(i)=[x^{(0)}(i),\ldots x^{(\nu-1)}(i)]^T \quad \text{[Equation 3]}$$

In Equation 3, $\nu$ denotes the number of layers, and i=0, 1, . . . , $M^{layer}_{symb}-1$.

$M^{layer}_{symb}$ denotes the number of modulation symbols per layer.

If the number of codewords is 1 or 2, codeword-to-layer mapping for spatial multiplexing can be performed as defined in Table 1 below.

TABLE 1

| Number of layers | Number of code-words | Codeword-to-layer mapping i = 0, 1, . . . , $M_{symb}^{layer}$ − 1 | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |

The layer permutator 1530 can perform modulation symbol level permutation (or interleaving) on the modulation symbol x(i) on which codeword-to-layer mapping is performed. Permutation may be performed in a unit of bit, in a unit of modulation order, in a unit of modulation order×a DFT size, and in a unit of modulation order×DFT size×(the number of SC-FDMA symbols of a slot or a subframe). When the modulation symbol level permutation is performed, a modulation symbol y(i) to be sent to each antenna port p is output as x(i).

A modulation symbol on which the modulation symbol level permutation is performed is denoted by y(i). Then, if the modulation symbol, i.e., $x(i)=[x^{(0)}(i),\ldots,x^{(\nu-1)}(i)]^T$, i=0, 1, . . . , $M^{layer}_{symb}-1$, on which codeword-to-layer mapping is performed is given as an input vector of the layer permutator

1530, the output vector, i.e., $y(i)=[y^{(0)}(i), \ldots y^{(p-1)}(i)]^T$, $i=0, 1 \ldots M^{layer}_{symb}-1$, on which the modulation symbol level permutation is performed can be given by Equation 4 below. It is assumed in Equation 4 that v and p are set to 2.

$$\begin{pmatrix} y^{(0)}(2i) & y^{(0)}(2i+1) \\ y^{(1)}(2i) & y^{(1)}(2i+1) \end{pmatrix} = \begin{pmatrix} x^{(0)}(2i) & x^{(1)}(2i+1) \\ x^{(1)}(2i) & x^{(0)}(2i+1) \end{pmatrix} \quad \text{[Equation 4]}$$

In Equation 4, it can be seen that modulation symbol level permutation is performed on $x^{(1)}(2i+1)$ and $x^{(0)}(2i+1)$. Equation 4 is for exemplary purposes only, and thus the modulation symbol-level permutation can be performed in various manners.

The transform precoders 1540-1, ..., 1540-N receive the modulation symbol y(i) on which the modulation symbol level permutation is performed, and performs a DFT operation on the received symbol. The DFT operation and the permutation may be performed in two ways, i.e., (1) the DFT operation is performed after performing permutation, and (2) the permutation is performed after performing the DFT operation. For example, when the permutation is performed in a unit of bit and in a unit of modulation order, the method (1) may be used, and when the permutation is performed in a unit of modulation order×a DFT size or in a unit of a modulation order×DFT size×(the number of SC-FDMA symbols of a slot or a subframe), any one of the methods (1) and (2) may be used.

The MIMO precoder 1550 processes an input symbol by using a MIMO scheme according to the multiple Tx antennas. That is, the MIMO precoder 1550 can perform layer-to-antenna mapping. The MIMO precoder 1550 distributes an antenna-specific symbol to the resource element mappers 1560-1, ..., 1560-N for a path of a specific antenna. Each information path transmitted to one antenna by the MIMO precoder 1550 by the use of one resource element mapper is called a stream. The antenna may be a physical antenna.

The resource element mappers 1560-1, ..., 1560-N allocate the antenna-specific symbol to a proper resource element, and perform multiplexing according to a user. The signal generators 1570-1, ..., 1570-N perform an inverse fast Fourier transform (IFFT) operation or an inverse Fourier transform (IFT) operation and thereafter perform digital to analog conversion (DAC). The signal generators 1570-1, ..., 1570-N may include an IFFT unit and a CP insertion unit. An analog signal output from the signal generators 1570-1, ..., 1570-N is transmitted through a physical antenna port.

Now, a mapping relation of $b^{(q)}(k)$ and $d^{(q)}(i)$, performed in the modulation mappers 1510-1, ..., 1510-K, will be described in detail in comparison with the conventional method.

<Conventional Method>

In the conventional method, the modulation mapper maps $b^{(q)}(k)$ and $d^{(q)}(i)$ according to a modulation order allocated for each codeword as shown in Table 2 below.

TABLE 2

```
i=0;
k=0;
while b^(q)(k)!=NULL,
    d^(q)(i)=f(b^(q)(k:k+M^(q)-1));
    i = i+1;
    k=k+M^(q);
end
```

In Table 2, $M^{(q)}$ denotes a modulation order of a codeword q (e.g., a value of $M^{(q)}$ may be BPSK: 1, QPSK: 2, 16QAM: 4, 64QAM: 6). $k:k+M^{(q)}-1$ denotes that a variable k is in the range of k to $k+M^{(q)}-1$. According to 3GPP TS. 36.211. V8.4.0, f( ) in Table 2 is defined as follows.

The modulation mapper receives a binary value 0 or 1 and outputs a complex value such as x=I+jQ. In case of BPSK, one bit b(i) is mapped as shown in Table 3 below.

TABLE 3

| b(i) | I | Q |
|---|---|---|
| 0 | $1/\sqrt{2}$ | $1/\sqrt{2}$ |
| 1 | $-1/\sqrt{2}$ | $-1/\sqrt{2}$ |

In case of QPSK, two bits b(i) and b(i+1) are mapped as shown in Table 4 below.

TABLE 4

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

In case of 16QAM, four bits b(i), b(i+1), b(i+2), and b(i+3) are mapped as shown in Table 5 below.

TABLE 5

| b(i), b(i + 1), b(i + 2), b(i + 3) | I | Q |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

In case of 64QAM, six bits b(i), b(i+1), b(i+2), b(i+3), b(i+4), and b(i+5) are mapped as shown in Table 6 below.

TABLE 6

| b(i), b(i + 1), b(i + 2), b(i + 3), b(i + 4), b(i + 5) | I | Q |
|---|---|---|
| 000000 | $3/\sqrt{42}$ | $3/\sqrt{42}$ |
| 000001 | $3/\sqrt{42}$ | $1/\sqrt{42}$ |
| 000010 | $1/\sqrt{42}$ | $3/\sqrt{42}$ |
| 000011 | $1/\sqrt{42}$ | $1/\sqrt{42}$ |
| 000100 | $3/\sqrt{42}$ | $5/\sqrt{42}$ |
| 000101 | $3/\sqrt{42}$ | $7/\sqrt{42}$ |
| 000110 | $1/\sqrt{42}$ | $5/\sqrt{42}$ |
| 000111 | $1/\sqrt{42}$ | $7/\sqrt{42}$ |
| 001000 | $5/\sqrt{42}$ | $3/\sqrt{42}$ |
| 001001 | $5/\sqrt{42}$ | $1/\sqrt{42}$ |
| 001010 | $7/\sqrt{42}$ | $3/\sqrt{42}$ |
| 001011 | $7/\sqrt{42}$ | $1/\sqrt{42}$ |
| 001100 | $5/\sqrt{42}$ | $5/\sqrt{42}$ |
| 001101 | $5/\sqrt{42}$ | $7/\sqrt{42}$ |

TABLE 6-continued

| b(i), b(i + 1), b(i + 2), b(i + 3), b(i + 4), b(i + 5) | I | Q |
|---|---|---|
| 001110 | $7/\sqrt{42}$ | $5/\sqrt{42}$ |
| 001111 | $7/\sqrt{42}$ | $7/\sqrt{42}$ |
| 010000 | $3/\sqrt{42}$ | $-3/\sqrt{42}$ |
| 010001 | $3/\sqrt{42}$ | $-1/\sqrt{42}$ |
| 010010 | $1/\sqrt{42}$ | $-3/\sqrt{42}$ |
| 010011 | $1/\sqrt{42}$ | $-1/\sqrt{42}$ |
| 010100 | $3/\sqrt{42}$ | $-5/\sqrt{42}$ |
| 010101 | $3/\sqrt{42}$ | $-7/\sqrt{42}$ |
| 010110 | $1/\sqrt{42}$ | $-5/\sqrt{42}$ |
| 010111 | $1/\sqrt{42}$ | $-7/\sqrt{42}$ |
| 011000 | $5/\sqrt{42}$ | $-3/\sqrt{42}$ |
| 011001 | $5/\sqrt{42}$ | $-1/\sqrt{42}$ |
| 011010 | $7/\sqrt{42}$ | $-3/\sqrt{42}$ |
| 011011 | $7/\sqrt{42}$ | $-1/\sqrt{42}$ |
| 011100 | $5/\sqrt{42}$ | $-5/\sqrt{42}$ |
| 011101 | $5/\sqrt{42}$ | $-7/\sqrt{42}$ |
| 011110 | $7/\sqrt{42}$ | $-5/\sqrt{42}$ |
| 011111 | $7/\sqrt{42}$ | $-7/\sqrt{42}$ |
| 100000 | $-3/\sqrt{42}$ | $3/\sqrt{42}$ |
| 100001 | $-3/\sqrt{42}$ | $1/\sqrt{42}$ |
| 100010 | $-1/\sqrt{42}$ | $3/\sqrt{42}$ |
| 100011 | $-1/\sqrt{42}$ | $1/\sqrt{42}$ |
| 100100 | $-3/\sqrt{42}$ | $5/\sqrt{42}$ |
| 100101 | $-3/\sqrt{42}$ | $7/\sqrt{42}$ |
| 100110 | $-1/\sqrt{42}$ | $5/\sqrt{42}$ |
| 100111 | $-1/\sqrt{42}$ | $7/\sqrt{42}$ |
| 101000 | $-5/\sqrt{42}$ | $3/\sqrt{42}$ |
| 101001 | $-5/\sqrt{42}$ | $1/\sqrt{42}$ |
| 101010 | $-7/\sqrt{42}$ | $3/\sqrt{42}$ |
| 101011 | $-7/\sqrt{42}$ | $1/\sqrt{42}$ |
| 101100 | $-5/\sqrt{42}$ | $5/\sqrt{42}$ |
| 101101 | $-5/\sqrt{42}$ | $7/\sqrt{42}$ |
| 101110 | $-7/\sqrt{42}$ | $5/\sqrt{42}$ |
| 101111 | $-7/\sqrt{42}$ | $7/\sqrt{42}$ |
| 110000 | $-3/\sqrt{42}$ | $-3/\sqrt{42}$ |
| 110001 | $-3/\sqrt{42}$ | $-1/\sqrt{42}$ |
| 110010 | $-1/\sqrt{42}$ | $-3/\sqrt{42}$ |
| 110011 | $-1/\sqrt{42}$ | $-1/\sqrt{42}$ |
| 110100 | $-3/\sqrt{42}$ | $-5/\sqrt{42}$ |
| 110101 | $-3/\sqrt{42}$ | $-7/\sqrt{42}$ |
| 110110 | $-1/\sqrt{42}$ | $-5/\sqrt{42}$ |
| 110111 | $-1/\sqrt{42}$ | $-7/\sqrt{42}$ |
| 111000 | $-5/\sqrt{42}$ | $-3/\sqrt{42}$ |
| 111001 | $-5/\sqrt{42}$ | $-1/\sqrt{42}$ |
| 111010 | $-7/\sqrt{42}$ | $-3/\sqrt{42}$ |
| 111011 | $-7/\sqrt{42}$ | $-1/\sqrt{42}$ |
| 111100 | $-5/\sqrt{42}$ | $-5/\sqrt{42}$ |
| 111101 | $-5/\sqrt{42}$ | $-7/\sqrt{42}$ |
| 111110 | $-7/\sqrt{42}$ | $-5/\sqrt{42}$ |
| 111111 | $-7/\sqrt{42}$ | $-7/\sqrt{42}$ |

If a modulation order of $x^{(0)}(2m)$ and $x^{(0)}(2m+1)$ ({2m, 2m+1}∈i) for a layer 0 is 2 (i.e., QPSK) and a modulation order of $x^{(1)}(2m)$ and $x^{(1)}(2m+1)$ ({2m, 2m+1}∈i) is 4 (i.e., 16QAM), then $y^{(0)}(2m)$ and $y^{(0)}(2m+1)$ (likewise, $y^{(1)}(2m)$ and $y^{(1)}(2m+1)$) have different modulation orders according to Table 1 and Equation 4. That is, if a plurality of codewords have different modulation orders, y(i) on which the modulation symbol level permutation is performed includes modulation symbols having different modulation orders, and thus a CM or PAPR is increased. Table 7 below shows an example of a CM value.

TABLE 7

| | QPSK only | 16 QAM only | QPSK + 16 QAM |
|---|---|---|---|
| CM (dB) | 1.22 | 2.14 | 1.72 |

In order to solve such a problem, according to the embodiment of the present invention, the modulation mapper maps $b^{(q)}(k)$ to $d^{(q)}(i)$ so that y(i) can be configured with symbols having the same modulation order for the same antenna port after the modulation symbol level permutation is performed in the layer permutator.

For clarity of explanation, it is assumed that layer permutation is performed on a modulation symbol basis only when the number of codewords is 2, i.e., a codeword 0 and a codeword 1 and i is odd number. In this case, the modulation mapper can perform modulation mapping as shown in Table 8 below.

Figure 16:
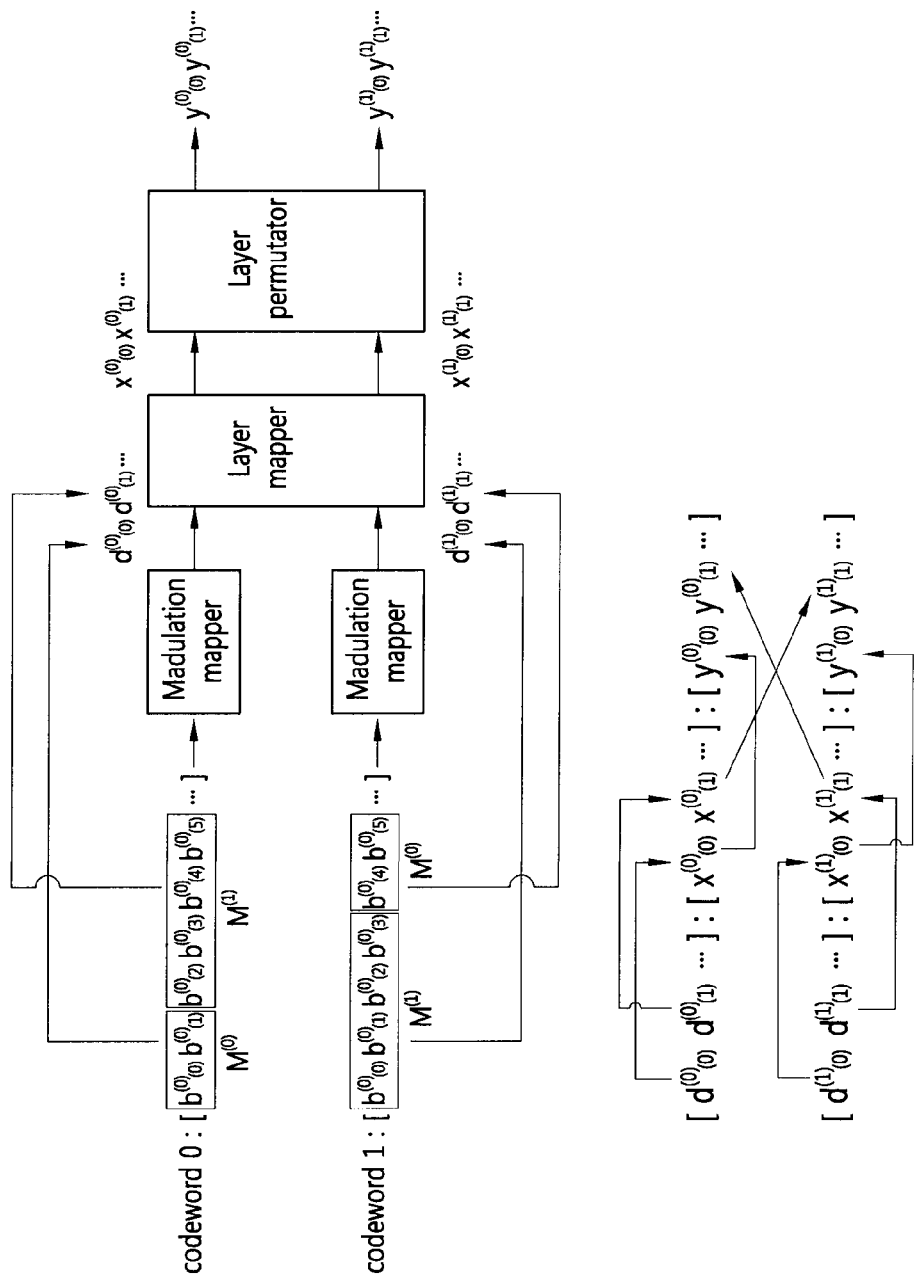
FIG. 16 shows a relation between modulation mapping described in Table 8 and layer permutation to be described below.

TABLE 8 i=0;
k=0;
while $b^{(0)}(k)$!=NULL,
  if mod(i,2)==0,
    $d^{(0)}(i)=f(b^{(0)}(k:k+M^{(0)}-1))$;
    // applying modulation order to be permutated.
    i=i+1;
    k=k+$M^{(0)}$;
  else,
    $d^{(0)}(i)=f(b^{(0)}(k:k+M^{(1)}-1))$;
    // applying modulation order to be permutated.
    i=i+1;
    k=k+$M^{(1)}$;
  end
end
i=0;
k=0;
while $b^{(1)}(k)$!=NULL,
  if mod(i,2)==0,
    $d^{(1)}(i)=f(b^{(1)}(k:k+M^{(1)}-1))$;
    // applying modulation order to be permutated.
    i=i+1;
    k=k+$M^{(1)}$;
  else,
    $d^{(1)}(i)=f(b^{(1)}(k:k+M^{(0)}-1))$;
    // applying modulation order to be permutated.
    i=i+1;
    k=k+$M^{(0)}$;
  end
end FIG. 16 shows a relation between the modulation mapping described in Table 8 and layer permutation to be described below.

Referring to Table 8 and FIG. 16, regarding a modulation symbol $d^{(0)}(i)$ after modulation mapping is performed on a codeword 0, if i is a multiple of 2, QPSK modulation is performed on 2 bits (e.g., $b^{(0)}(0)$ and $b^{(0)}(1)$) according to a modulation order $M^{(0)}$ of the codeword 0, and if i is not a multiple of 2, 16QAM modulation is performed on 4 bits (e.g., $b^{(0)}(2)$, $b^{(0)}(3)$, $b^{(0)}(4)$, $b^{(0)}(5)$) according to a modulation order $M^{(1)}$ of the codeword 1. That is, QPSK, 16QAM, QPSK, 16QAM, etc., are repeated in the order of 2 bits, 4 bits, 2 bits, 4 bits, etc.

Regarding a modulation symbol $d^{(1)}(i)$ after modulation mapping is performed on a codeword 1, if i is a multiple of 2, 16QAM modulation is performed on 4 bits according to a modulation order $M^{(1)}$ of the codeword 1, and if i is not a multiple of 2, QPSK modulation is performed on 2 bits according to a modulation order) $M^{(0)}$ of the codeword 0. That is, 16QAM, QPSK, 16QAM, QPSK, etc., are repeated in the order of 4 bits, 2 bits, 4 bits, 2 bits, etc.

Layer mapping can be performed by the layer mapper according to Table 1. Then, $[x^{(0)}(0)\ x^{(0)}(1)\ \ldots\ x^{(0)}(M^{layer}_{symb}-1)]$ is $[d^{(0)}(0), d^{(0)}(1), \ldots d^{(0)}(M^{layer}_{symb}-1)]$. $[x^{(0)}(0)\ x^{(1)}(1)\ \ldots\ x^{(1)}(M^{layer}_{symb}-1)]$ is $[d^{(1)}(0), d^{(1)}(1), \ldots d^{(1)}(M^{layer}_{symb}-1)]$. When layer permutation is performed by Equation 4, it is equivalent to $[y^{(0)}(0)\ y^{(0)}(1)\ \ldots\ ]=[d^{(0)}(0)\ d^{(1)}(1)\ \ldots\ ]$, $[y^{(1)}(0)\ y^{(1)}(1)\ \ldots\ ]=[d^{(1)}(0)\ d^{(0)}(1)\ \ldots\ ]$.

Therefore, when the modulation symbol level permutation is performed by the layer permutator, $y^{(0)}(i)$ equally has a modulation order 2, and $y^{(1)}(i)$ equally has a modulation order 4.

That is, the modulation mapper repetitively performs different modulation schemes with respect to one codeword by considering the modulation symbol level permutation performed by the layer permutator. As a result, modulation symbols having the same modulation order are generated for respective antenna ports. This can be expressed such that a modulation symbol having a modulation order which is fit to a DFT size of the transform precoder is generated. Therefore, layer permutation can be performed while maintaining a low CM and a single-carrier property.

Figure 17:
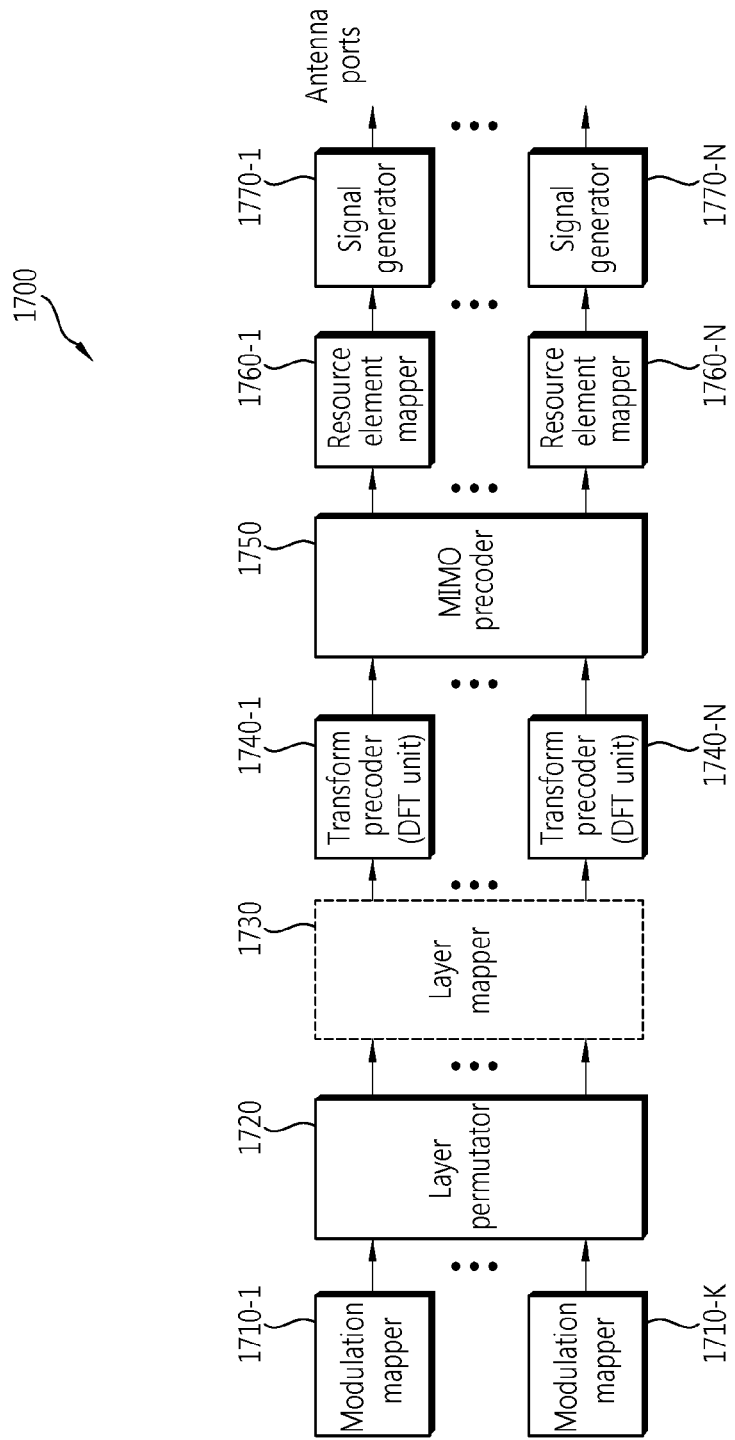
FIG. 17 is a block diagram showing a structure of a transmitter according to another embodiment of the present invention.

FIG. 17 is a block diagram showing a structure of a transmitter according to another embodiment of the present invention.

In comparison with FIG. 15, a layer permutator is located in front of a layer mapper. That is, the present invention is applicable as long as the layer permutator is located in front of the transform precoder.

In addition, the layer mapper can be omitted. For example, in Table 1, in a case where the number of layers is 1 and the number of codewords is 1 and in a case where the number of layers is 2 and the number of codewords is 2, the modulation symbol $d^{(q)}(i)$ and layer-mapped symbol $x^{(q)}(i)$ are equivalent to each other. Therefore, layer mapping may not be performed, and the modulation symbol $d^{(q)}(i)$ modulated to a complex value can be directly applied to layer permutator.

The present invention is applicable when DFT is performed for transmission of an SC-FDMA signal. For example, an apparatus and method according to the present invention are applicable when a UE transmits a UL signal to a BS.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for data transmission in a multi-antenna system, the apparatus comprising:
a modulation mapper for modulating a first codeword and a second codeword into first modulation symbols and second modulation symbols respectively, wherein the first modulation symbols are constituted in the order of a modulation symbol having a first modulation order and a modulation symbol having a second modulation order, and the second modulation symbols are constituted in the order of a modulation symbol having the second modulation order and a modulation symbol having the first modulation order;
a layer mapper for mapping, on a codeword basis, the first modulation symbols to a first layer and for mapping the second modulation symbols to a second layer; and
a layer permutator for mapping, on a modulation symbol basis, the modulation symbol having the second modulation order in the first layer to the second layer and the modulation symbol having the first modulation order in the second layer to the first layer.

2. The apparatus of claim 1, further comprising:
a transform precoder for generating a discrete Fourier transform (DFT) symbol of a frequency domain by performing DFT on output of the layer permutator;
a resource element mapper for mapping the DFT symbol to a physical resource element; and
a signal generator for generating a single carrier-frequency division multiple access (SC-FDMA) signal from the DFT symbol mapped to the resource element.

3. The apparatus of claim 1, wherein the first modulation order and the second modulation order are different from each other.

4. A method for data transmission, the method comprising:
modulating a first codeword and a second codeword into first modulation symbols and second modulation symbols respectively, wherein the first modulation symbols are constituted in the order of a modulation symbol having a first modulation order and a modulation symbol having a second modulation order, and the second modulation symbols are constituted in the order of a modulation symbol having the second modulation order and a modulation symbol having the first modulation order;
mapping, on a codeword basis, the first modulation symbols to a first layer and the second modulation symbols to a second layer; and
mapping, on a modulation symbol basis, the modulation symbol having the second modulation order in the first layer to the second layer and the modulation symbol having the first modulation order in the second layer to the first layer.

5. The method of claim 4, further comprising:
generating a discrete Fourier transform (DFT) symbol of a frequency domain by performing DFT on output of the permutating step;
mapping the DFT symbol to a physical resource element; and
generating a single carrier-frequency division multiple access (SC-FDMA) signal from the DFT symbol mapped to the resource element.

6. The method of claim 4, wherein the first modulation order and the second modulation order are different from each other.

* * * * *